(12) United States Patent
Lukaszewicz

(10) Patent No.: US 10,525,659 B2
(45) Date of Patent: Jan. 7, 2020

(54) VEHICLE COMPONENT WITH AT LEAST ONE SANDWICH PART

(71) Applicant: Bayerische Motoren Werke Aktiengesellschaft, Munich (DE)

(72) Inventor: Dirk Lukaszewicz, Augsburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 76 days.

(21) Appl. No.: 15/700,335

(22) Filed: Sep. 11, 2017

(65) Prior Publication Data

US 2017/0368788 A1 Dec. 28, 2017

Related U.S. Application Data

(63) Continuation of application No. PCT/EP2016/055286, filed on Mar. 11, 2016.

(30) Foreign Application Priority Data

Mar. 12, 2015 (DE) .......................... 10 2015 204 425
Mar. 12, 2015 (DE) .......................... 10 2015 204 426

(51) Int. Cl.
*B32B 3/26* (2006.01)
*B32B 5/18* (2006.01)
(Continued)

(52) U.S. Cl.
CPC ............... *B32B 3/266* (2013.01); *B32B 1/00* (2013.01); *B32B 3/085* (2013.01); *B32B 3/20* (2013.01);
(Continued)

(58) Field of Classification Search
CPC ....................................................... B32B 3/266
(Continued)

(56) References Cited

U.S. PATENT DOCUMENTS 5,518,802 A 5/1996 Colvin et al.
8,828,513 B2 9/2014 Tiwari et al.
(Continued)

FOREIGN PATENT DOCUMENTS

CH 681971 A5 6/1993
CN 102202881 A 9/2011
(Continued)

OTHER PUBLICATIONS

German-language Search Report issued in counterpart German Application No. 10 2016 204 058.8 dated Jun. 6, 2016 with partial English translation (Thirteen (13) pages).
(Continued)

*Primary Examiner* — Brent T O'Hern
(74) *Attorney, Agent, or Firm* — Crowell & Moring LLP

(57) ABSTRACT

A vehicle component has at least one sandwich part which forms a crash element that absorbs kinetic energy. The at least one sandwich part has a layer structure of at least two fiber-reinforced and one synthetic resin matrix-containing cover layer elements and at least one core layer element provided between two adjacent cover layer elements. The at least one core layer element has channels which pass transversely through each cover layer element and/or the core layer element. The at least one core layer element is made of a hard foam material or a softwood, and the channels provided in the core layer element form predetermined breaking points for the core layer element.

12 Claims, 3 Drawing Sheets

(51) Int. Cl.
| | |
|---|---|
| B32B 7/00 | (2019.01) |
| B32B 7/08 | (2019.01) |
| B32B 21/08 | (2006.01) |
| B32B 27/00 | (2006.01) |
| B32B 27/06 | (2006.01) |
| B32B 27/08 | (2006.01) |
| B32B 3/20 | (2006.01) |
| B64C 1/06 | (2006.01) |
| F16F 7/12 | (2006.01) |
| B32B 5/02 | (2006.01) |
| B32B 5/06 | (2006.01) |
| B32B 5/24 | (2006.01) |
| B32B 5/26 | (2006.01) |
| B32B 21/10 | (2006.01) |
| B32B 21/14 | (2006.01) |
| B32B 1/00 | (2006.01) |
| B32B 3/08 | (2006.01) |
| B62D 21/15 | (2006.01) |
| B62D 29/04 | (2006.01) |
| B32B 7/05 | (2019.01) |
| B62D 25/02 | (2006.01) |

(52) U.S. Cl.
CPC .................. *B32B 5/02* (2013.01); *B32B 5/06* (2013.01); *B32B 5/18* (2013.01); *B32B 5/245* (2013.01); *B32B 5/26* (2013.01); *B32B 7/00* (2013.01); *B32B 7/05* (2019.01); *B32B 7/08* (2013.01); *B32B 21/08* (2013.01); *B32B 21/10* (2013.01); *B32B 21/14* (2013.01); *B32B 27/00* (2013.01); *B32B 27/065* (2013.01); *B32B 27/08* (2013.01); *B62D 21/15* (2013.01); *B62D 29/04* (2013.01); *B64C 1/062* (2013.01); *F16F 7/12* (2013.01); *F16F 7/124* (2013.01); *B32B 2250/03* (2013.01); *B32B 2250/40* (2013.01); *B32B 2260/021* (2013.01); *B32B 2260/023* (2013.01); *B32B 2260/046* (2013.01); *B32B 2262/106* (2013.01); *B32B 2307/558* (2013.01); *B32B 2307/56* (2013.01); *B32B 2571/00* (2013.01); *B32B 2605/00* (2013.01); *B32B 2605/08* (2013.01); *B62D 25/025* (2013.01)

(58) Field of Classification Search
USPC .......................................................... 428/43
See application file for complete search history.

(56) References Cited

U.S. PATENT DOCUMENTS

2011/0036149 A1* 2/2011 Bach ....................... G01M 3/26
73/40.7
2011/0250384 A1 10/2011 Sumi et al.

FOREIGN PATENT DOCUMENTS

| DE | 101 28 054 A1 | 12/2002 |
|---|---|---|
| DE | 10 2004 062 895 A1 | 6/2006 |
| DE | 10 2005 013 390 A1 | 9/2006 |
| EP | 2 343 185 A1 | 7/2011 |
| WO | WO 2008/049469 A1 | 5/2008 |

OTHER PUBLICATIONS

International Search Report (PCT/ISA/210) issued in PCT Application No. PCT/EP2016/055286 dated May 31, 2016 with English translation (Six (6) pages).
German-language Written Opinion (PCT/ISA/237) issued in PCT Application No. PCT/EP2016/055286 dated May 31, 2016 (Six (6) pages).
German-language Search Report issued in counterpart German Application No. 10 2015 204 425.4 dated Aug. 4, 2015 with partial English translation (Thirteen (13) pages).
German-language Search Report issued in counterpart German Application No. 10 2015 204 426.2 dated Oct. 26, 2015 with partial English translation (Thirteen (13) pages).
Chinese-language Office Action issued in counterpart Chinese Application No. 201680004363 dated Sep. 12, 2018 with English translation (21 pages).
Chinese-language Office Action issued in counterpart Chinese Application No. 201680004363.X dated Apr. 30, 2019 with English translation (15 pages).

* cited by examiner

VEHICLE COMPONENT WITH AT LEAST ONE SANDWICH PART

CROSS REFERENCE TO RELATED APPLICATIONS

This application is a continuation of PCT International Application No. PCT/EP2016/055286, filed Mar. 11, 2016, which claims priority under 35 U.S.C. § 119 from German Patent Applications No. 10 2015 204 426.2, filed Mar. 12, 2015, and No. 10 2015 204 425.4, filed Mar. 12, 2015, the entire disclosures of which are herein expressly incorporated by references.

BACKGROUND AND SUMMARY OF THE INVENTION

The invention relates to a vehicle component with at least one sandwich part. It furthermore relates to a method for the production of such a vehicle component. Thus, the invention also addresses the use of a sandwich part as a crash element absorbing kinetic energy in a vehicle.

Traditional crash elements in vehicles, especially in motor vehicles, are formed from plastically deformable materials, usually metals, and transform the kinetic energy of the collision partners into deformation energy. Especially during side-impact collisions, this transformation occurs through bending sills provided in the vehicle floor and in the vehicle side walls and vehicle doors.

The constant striving to reduce the energy consumption of a vehicle has meant that metal parts of vehicles are being replaced increasingly by fiber composites. Fiber composites, such as carbon fiber composites (CFC), may have a high bending stiffness, especially when designed as a sandwich part, but they have an extremely low ductility as compared to metallic materials. Energy-absorbing crash elements consisting of plastics instead of metal therefore do not transform the kinetic energy of the collision partners into ductile deformation energy, but instead into a free surface due to material fragmentation. This fragmentation process, in order to transform as much energy as possible, must be highly efficient; that is, the components directly involved in the collision must undergo fragmentation into the smallest possible pieces. This holds especially for sandwich parts, which are used especially advantageously for load-bearing vehicle parts, but also for large-area parts such as vehicle floors, on account of their good bending stiffness.

The inventor has found that sandwich parts with a layered structure of fiber-reinforced cover layer elements and a core layer element arranged in between, when subjected to large impulse forces parallel to the connection surfaces between the cover layer elements and the core layer element, have a tendency to bulge at first before fragmenting. A core layer element consisting of hard foam in particular has a tendency, when the individual layers are separated from each other in the region of their contact surfaces, to form folds between the detaching cover layer elements before fragmenting. Such a folding process consumes only a very small portion of the kinetic energy applied, and results in a delaying of the fragmentation process which breaks down the major portion of the kinetic energy. Therefore, the effective breakdown of the kinetic energy is delayed and occurs too slowly.

DE 101 28 054 A1 shows and describes a layered composite sheet with openings running in its thickness direction. This known layered composite sheet comprises two carbon fiber-reinforced plastic cover layers, between which is provided a light support layer made of a foam plastic. The openings are fashioned as cylindrical channels which penetrate the layered composite sheet at right angles to its surface. The area of application for such layered composite sheets is, for example, textile machine building or airplane building. A layered composite sheet is to be created in the described manner which for the most part avoids a weakening of the strength or rigidity in the region of the openings. This is accomplished in that an interruption of the reinforcement fibers in the plastic cover layers is avoided by a special manufacturing process in which the reinforcement fibers are led around the openings. This results in a compression of the fiber layer in the regions of the plastic cover layers between the individual openings. Thus, the goal here is to increase the strength of such layered composite sheets.

CH 681 971 A5 concerns a composite with embedded reinforcement. This composite comprises two cover sheets of thermoplastic material, between which is provided a perforated metallic reinforcement layer, i.e., a perforated metal sheet. A composite sheet is to be created with high strength properties, while retaining a deformability, in order to be able to form shaped parts from such a composite or to enable an energy absorption by deformation in the event of a crash, for example. This is accomplished by the perforated metal sheet layer in the plastic composite. The described layered material should be especially suitable for the production of body parts ensuring the highest possible energy absorption under any actions of force. Thus, the purpose of this known layered composite design is to create a light material with high strength properties, which is able under the action of strong force to break down energy by plastic deformation.

WO 2008/049469 A1 shows and describes a sandwich structure made of two textile planar structures for use in resin-bound shell-type components, wherein a filler material is provided between the textile planar structures and wherein the sandwich design made from the two planar structures and the filler material arranged in between is tufted or stitched together. The filler material is formed by an elastic foam plastic layer, so that the sandwich design can be formed three-dimensionally into shell-type parts. A stiffening of such a three-dimensional structure is seen as being undesirable.

The problem which the present invention solves is to design a vehicle component with at least one sandwich part with a layered structure of at least two fiber-reinforced cover layer elements and at least one core layer element provided between two adjacent cover layer elements, so that in the event of impact loads arising, a more effective absorbing of the impact energy occurs by the sandwich part. Furthermore, the present invention provides a method for the production of such a vehicle component.

According to the invention, a vehicle component is provided with at least one sandwich part which forms a crash element absorbing kinetic energy, wherein the at least one sandwich part has a layered structure of at least two fiber-reinforced cover layer elements having a synthetic resin matrix and at least one core layer element provided between two adjacent cover layer elements, and wherein the at least one core layer element comprises channels which pass transversely through the at least one core layer element. The at least one core layer element is formed from a hard foam material or a softwood and the channels provided in the core layer element form predetermined breaking points for the core layer element.

Since the core layer element is formed from a hard foam material or from a softwood, such as balsa wood, or comprises such a hard foam material or softwood, the sandwich part has a high bending stiffness with low weight. The channels which run transversely, preferably at right angles, to the layered structure form predetermined breaking points in the respective layer element, at which the desired fragmentation can occur. The bulging or material folding observed in the experiment with the prior art is prevented in the case of the sandwich part according to the invention in that the predetermined breaking points ensure a fragmentation upon peeling of the layers of the sandwich part already when lesser bending stresses occur in the isolated layer element.

Preferably, at least one of the cover layer elements of the at least one sandwich part also includes channels which pass transversely through the respective cover layer element. In this way, predetermined breaking points are also created in the respective cover layer element. In this variant, the channels provided in the cover layer element also contribute to the improved fragmentation and thus to the energy transformation. In one advantageous embodiment, the channels are formed in both cover layer elements and in the core layer element.

It is also advantageous for the channels to be arranged at least in one region of the sandwich part at uniform spacing from each other. In this way, the failure behavior of the part in this region is designed to be substantially homogeneous. This means that a uniform fragmentation and thus, in the event of a collision, a controlled dissipation of kinetic energy may occur in this region.

The spacing between neighboring channels may in other regions likewise be uniform, but larger or smaller than in neighboring regions of the at least one sandwich part. In this way, regions with fragmentation occurring at different rates can be formed, so that it is possible to steer the fracturing behavior of the sandwich part and thus the intensity of the energy dissipation.

Preferably the cover layer elements comprise carbon fibers which are embedded in the respective synthetic resin matrix in the finished state of the sandwich part. Carbon fibers possess not only a high strength to weight ratio, but are also especially suited to a highly efficient energy-consuming fragmentation.

In one advantageous embodiment, the channels are formed by through holes, preferably through boreholes, which pass through the respective cover layer element or the core layer element. The forming of the channels as through holes entirely passing through the respective layer element in the transverse direction has the benefit that the fragmentation occurs without delay, regardless of the direction in which the respective layer element bulges.

In certain applications it is advantageous for the channels to be formed only in the core layer element and for the openings of the channels to be covered by the respective cover layer element. This variant is preferred when the sandwich part is exposed to external dust or moisture influences, since in this embodiment the cover layer elements close the channels and prevent the penetration of foreign bodies or moisture. Of course, the openings of the channels may be provided in the core layer element and in at least one of the cover layer elements. For example, in addition, only one of the cover layer elements may be closed and have no channel openings if the side of the sandwich part with this cover layer element is exposed to external dust or moisture influences.

In other applications, the channels are formed in the core layer element and in both cover layer elements. In this variant, the channels provided in the cover layer elements contribute to the improved fragmentation.

Of particular advantage is an embodiment of the invention in which the at least two cover layer elements and the at least one core layer element in the sandwich part are mechanically joined to each other by tensile force transmitting elements passing transversely through them.

The tensile force transmitting elements between the cover layer elements hold the layered structure together and brace transverse forces between the cover layer elements which occur under the action of an impact force. Thus, they prevent the cover layer elements from detaching from the core layer element. This slows down the penetration of a collision partner, such as a post, into the sandwich part, because the collision energy has already been dissipated immediately at the start of the collision by fragmentation of the sandwich part, especially by fragmentation of the respective cover layers and the core layer. Thus, the fragmentation occurs successively from the penetration side of the collision partner and continues steadily with increasing depth of penetration, the rate of penetration of the collision partner being effectively slowed down by the energy dissipation. Thus, thanks to the cohesion of the layered structure by way of the tensile force transmitting elements, it is ensured already at the start of the penetration of the collision partner that the highly effective energy-consuming fragmentation of all elements of the layered structure involved, for example both the cover layer elements and the core layer element, commences at once. The depth of penetration of the collision partner is therefore significantly less in the sandwich part of the vehicle component according to the invention for a given kinetic energy than in a traditional sandwich without the tensile force transmitting elements according to the invention, in which significantly less energy per unit of penetration is dissipated on account of a separating of the individual layers.

It is advantageous for the tensile force transmitting elements to be led through the channels. In this way, the failure behavior can be steered by way of channels attached in a defined way, wherein the corresponding design is not affected by additionally provided stitching holes.

Preferably, the tensile force transmitting elements are fixed by the synthetic resin matrix in or on the respective cover layer element. This accomplishes an especially effective binding of the tensile force transmitting elements to the respective cover layer, so that large tensile forces between the cover layers can be braced by use of the tensile force transmitting elements.

It is also of advantage for the tensile force transmitting elements to be formed by wires or threads which are introduced into the layered structure by tufting or stitching and which are fixed in or on the cover layer elements. This embodiment has the advantage of being produced in a simple and economical way.

This method according to the invention for the production of a vehicle component according to the invention with at least one sandwich part forming a crash element absorbing kinetic energy is characterized by the steps of:
   providing a layered structure of at least one core layer element formed from a hard foam material or a softwood and at least two cover layer elements, which have fibers, especially carbon fibers, and a synthetic resin matrix and which are arranged on two sides of the core layer element facing away from each other;
   introducing channels as predetermined breaking points in at least one of the cover layer elements and/or in the at least one core layer element, which pass transversely through the respective cover layer element or the core layer element, before or after the forming of the layered structure and before or after the crosslinking and curing of the respective synthetic resin matrix.

The introducing of the channels may occur prior to the juxtaposing of the layer elements of the layered structure or after the juxtaposing, depending on whether all layer elements are to be penetrated by the channels or only individual layer elements. If the introducing of the channels is done after the juxtaposing of the layer elements, i.e., the channels penetrate all layer elements of the layered structure, the channels may be introduced before or after the crosslinking and curing of the respective synthetic resin matrix.

Preferably the introducing of the channels is done by needling of the respective layer element. In this way, a fast processing by machine is possible.

An especially preferred application of the method according to the invention occurs in the production of vehicle components in which a sandwich part produced by the method according to the invention is used as a crash element absorbing kinetic energy of the vehicle. This application of the method according to the invention and the associated use of such a sandwich part in the vehicle component according to the invention combine the benefit of light vehicle construction with a highly effective crash safety.

Preferably, the introducing of the channels is done by needling of the respective layer element.

It is also of particular benefit for the layers of the layered structure to be mechanically joined to each other by introducing and fixing tensile force transmitting elements transversely to the individual layers. This accomplishes the already described strengthened mechanical cohesion of the individual layers.

The introducing and fixing of the tensile force transmitting elements in the layered structure transversely to the individual layers is done immediately after the superposing of the individual layer elements, i.e. before the layered structure is processed further into a hard and firm sandwich material. Semifinished fibers used for the cover layers may be fabrics, scrims, or fiber mats, but the spraying on of fibers is also not ruled out. Preferably, semifinished fibers such as prepregs or rovings are used to form the cover layers.

Preferable is a variant of the method according to the invention in which the step of introducing tensile force transmitting elements is done by stitching of the layers of the layered structure or by tufting of the layers of the layered structure, wherein in the case of tufting the resulting loops are glued in a following step to the synthetic resin matrix of the associated cover layer element or embedded in the latter. A stitching can be done with traditional industrial machinery or stitching robots. The tufting can also be done by means of traditional machines from textile processing. The loops created during the tufting are glued in a following step to the synthetic resin matrix of the associated cover layer element or embedded in the latter. In this way, the loop side of the tufted material is also firmly joined to the cover layer there in that the loops are embedded in the synthetic resin matrix or glued to it.

It is especially advantageous to perform the step of crosslinking and curing of the respective synthetic resin matrix of the cover layers only after the step of introducing the tensile force transmitting elements into the layered structure. This has the advantage that the tensile force transmitting elements can still be incorporated in the soft and uncured cover layer elements, so that only slight forces must be expended for this. During stitching or tufting, this brings the advantage that traditional industrial stitching machines from textile processing may be used for these steps of the method. Moreover, this configuration of the method according to the invention ensures that the tensile force transmitting elements, such as wires or threads, are firmly connected to the synthetic resin matrix of the cover layers.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
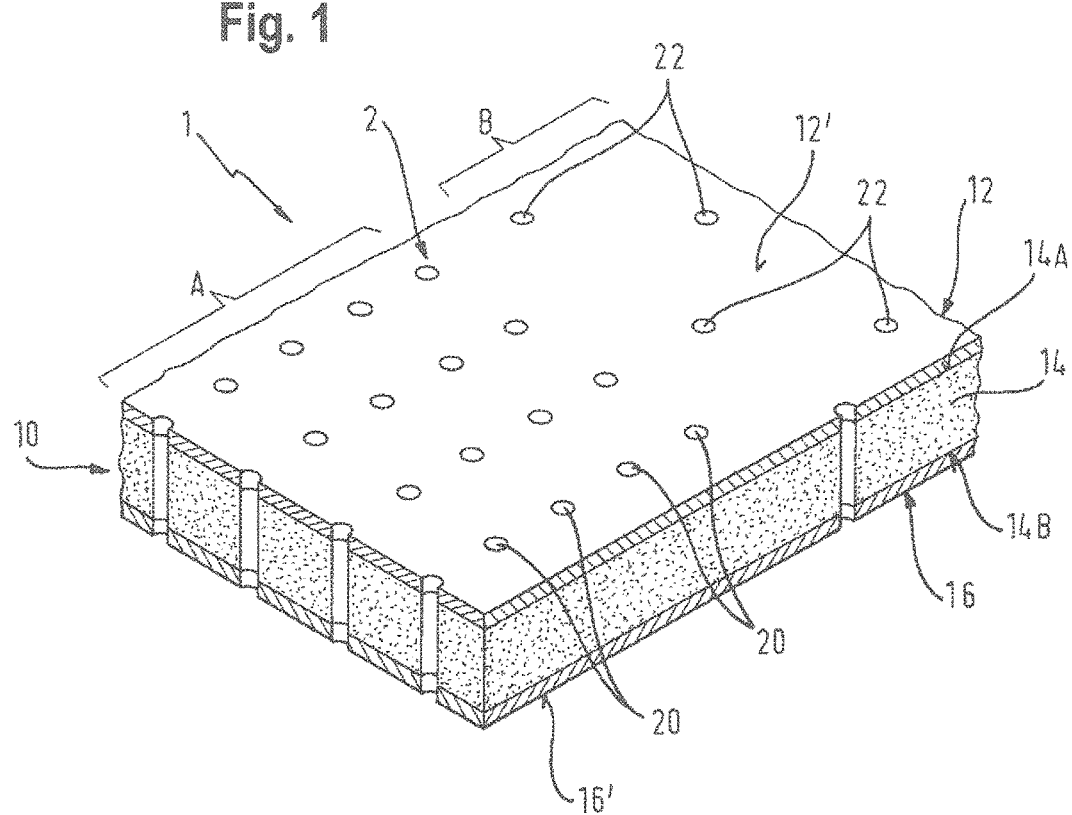
FIG. 1 shows a perspective view of a partly sectioned sandwich part according to an embodiment of the invention.

FIG. 1 shows in perspective representation a sandwich part 1 with a layered structure 10 of two fiber-reinforced cover layer elements having a synthetic resin matrix, a first cover layer element 12 and a second cover layer element 16, between which is situated a core layer element 14 consisting of hard foam material or softwood (such as balsa wood). The cover layer elements 12, 16 consist for example of a carbon fiber, synthetic resin composite material and are preferably applied to the core layer element 14 as semifinished fibers, for example as fiber mats pre-impregnated with matrix material (synthetic resin). The consistency of these pre-impregnated fiber mats, also known as "prepregs", is slightly sticky, so that the cover layer elements 12, 16 adhere to the sides 14A, 14B of the core layer element 14 facing away from each other.

This layered structure 10 of the first cover layer element 12, the core layer element 14, and the second cover layer element 16 has a plurality of through holes 20, 22 forming channels 2. These through holes 20, 22 pass through the first cover layer element 12, the core layer element 14 and the second cover layer element 16 and emerge on the one hand on the outer surface 12' of the first cover layer element 12 and on the other hand on the outer surface 16' of the second cover layer element.

It is seen from FIG. 1 that the through holes 20 in a first region A of the sandwich part 1 are arranged at uniform distance from each other. Also in a second region B of the sandwich part 1 the through holes 22 have the same spacing from each other, but this spacing is larger than the spacing between the through holes 20 in region A. This distribution of the through holes 20, 22 has the effect that the fragmentation in region A with the smaller hole spacing is faster and more effective, i.e. more energy consuming, than in region B with the larger hole spacing. This shows that the fragmentation behavior can be influenced by the choice of the hole spacing.

Figure 2:
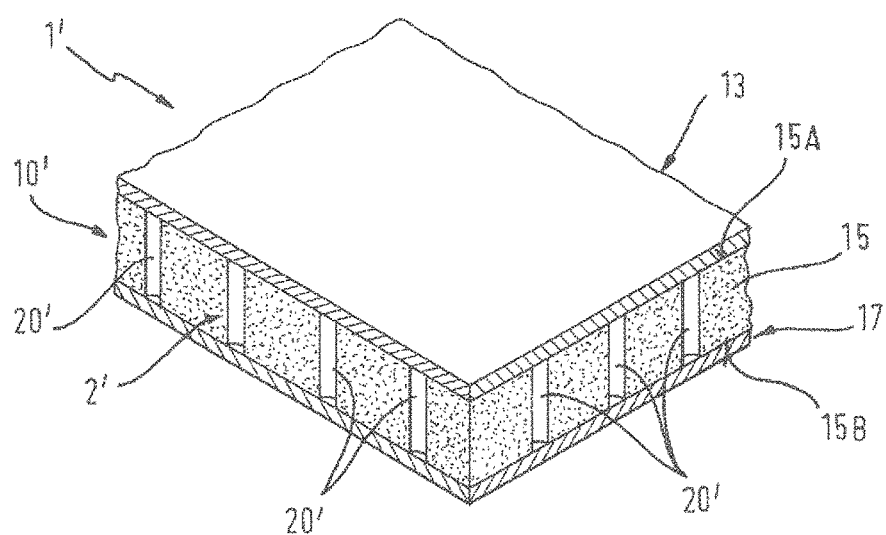
FIG. 2 shows a representation corresponding to the representation in FIG. 1 of an alternative embodiment of the sandwich part according to the invention.

In the alternative embodiment shown in FIG. 2, the channels 2' formed as through holes 20' are provided only in the core layer element 15. The two cover layer elements 13, 17 are closed in formation and cover the through holes 20' on both sides 15A, 15B of the core layer element 15 facing away from each other and seal them. The improved fragmentation effect in this embodiment is confined to the core layer element 15. The closed cover layer elements 13, 17 prevent moisture and foreign bodies from getting into the through holes 20'. Therefore, this embodiment can be used, for example, for bottom sheets of vehicles.

The sandwich parts and semifinished sandwich parts may additionally have tensile force transmitting elements passing transversely through the layered structure 10', which can transmit tensile forces between the two cover layer elements 13, 17, as is described in applicant's parallel patent application (DE 102015204425.4).

The invention is not confined to the layered structure shown. Thus, in place of the one core layer element there may also be provided several core layer elements, between each of which an intermediate layer element is arranged, which preferably corresponds to the cover layer elements. The tensile force transmitting elements then likewise extend through the entire layered structure.

Figure 3:
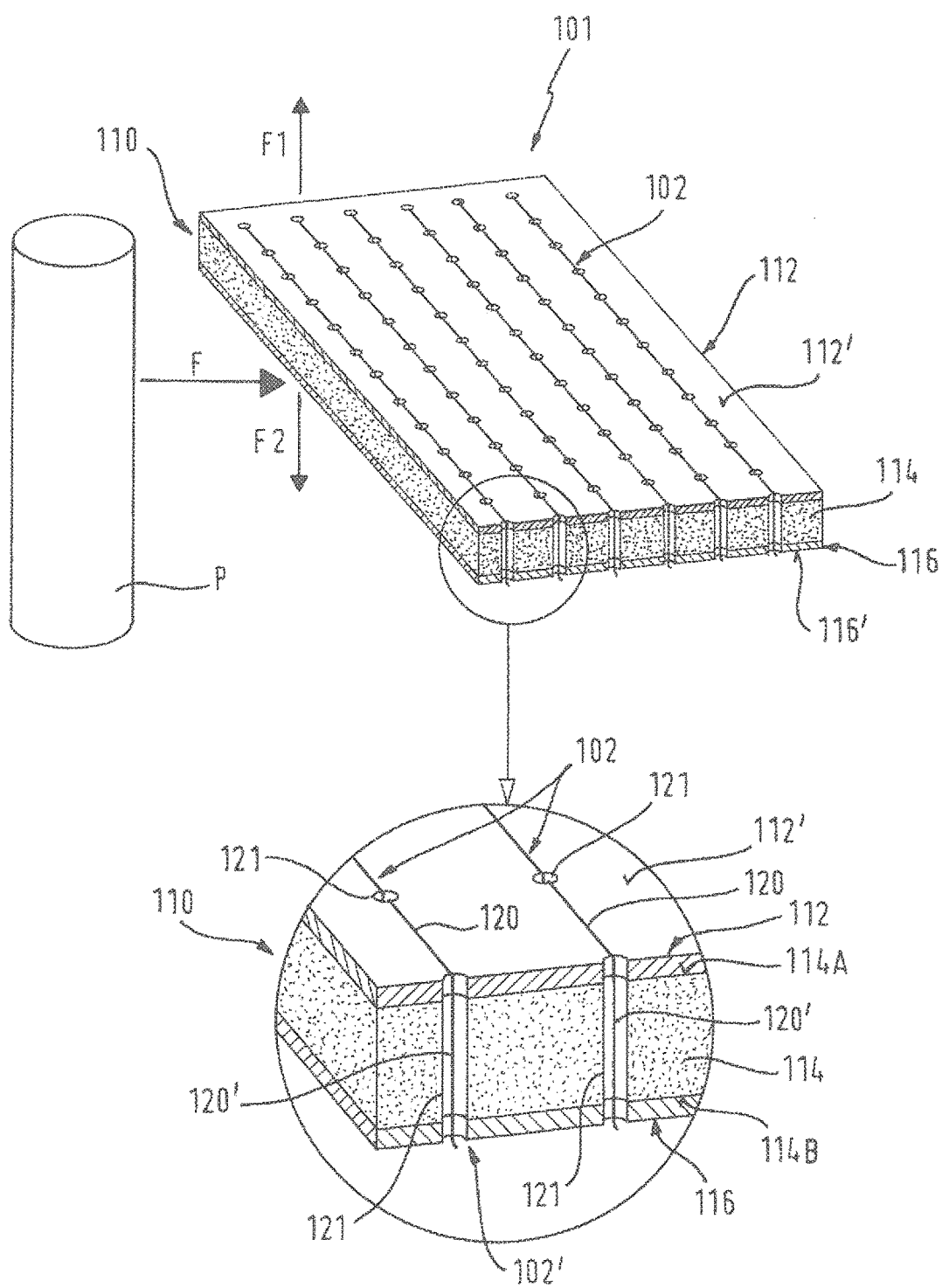
FIG. 3 shows a perspective view of a partly sectioned sandwich part according to an embodiment of the invention with stitched layers with a magnified feature.

FIG. 3 shows in perspective representation a sandwich part 101 with a layered structure 110 of two fiber-reinforced cover layer elements having a synthetic resin matrix, a first cover layer element 112 and a second cover layer element 116, between which is situated a core layer element 114 consisting of hard foam material or softwood (such as balsa wood). The cover layer elements 112, 116 consist for example of a carbon fiber, synthetic resin composite material and are preferably applied to the core layer element 114 as semifinished fibers, for example as fiber mats pre-impregnated with matrix material (synthetic resin). The consistency of these pre-impregnated fiber mats, also known as "prepregs", is slightly sticky, so that the cover layer elements 112, 116 adhere to the sides 114A, 114B of the core layer element 114 facing away from each other.

This layered structure 110 already forming a sandwich construction made from the first cover layer element 112, the core layer element 114, and the second cover layer element 116, is joined together by stitching or tufting with a traditional industrial stitching machine in a direction transverse to the longitudinal extension, i.e., for example, perpendicular to the upper outer surface 112' of the first cover layer element 112 visible in FIG. 3. In this process, by means of the stitching machine and a stitching needle affixed to it or a correspondingly designed tufting machine and the needle affixed to it, either threads or wires are led through existing through holes, provided as predetermined breaking points, or thread guide holes 121 are pierced by means of the needle transversely through the layered structure 110 and corresponding threads are pushed through the thread guide holes 121. In this case, the thread guide holes introduced into the sandwich structure form the predetermined breaking points for the respective layer of the sandwich part.

On the top side of the layered structure, i.e. on the outer surface 112' of the first cover layer element 112 visible in FIG. 3, the thread 120 forms a traditional stitched pattern. In a stitched layered structure 110, a corresponding stitched pattern is also formed on the underside, i.e. on the outer surface 116' of the second cover layer element 116 not visible in FIG. 1.

Figure 4:
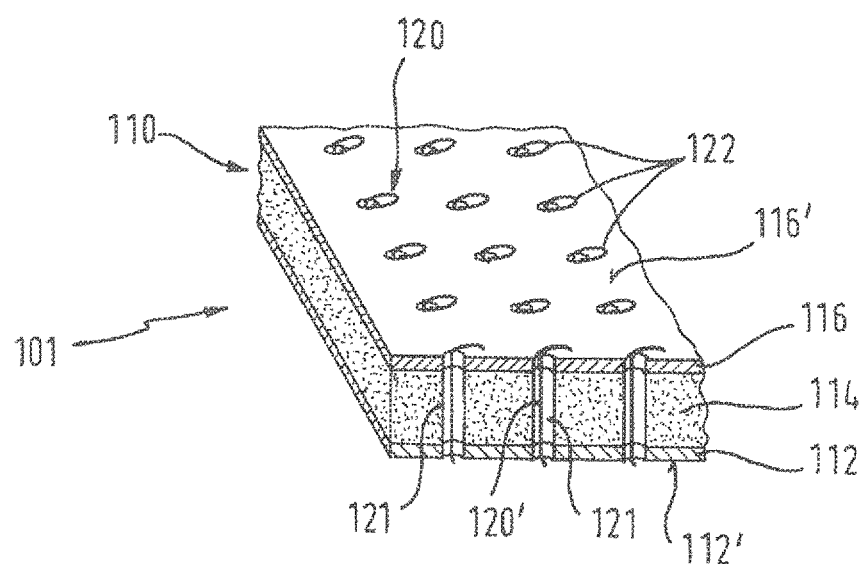
FIG. 4 shows a representation corresponding to the representation in FIG. 3 of an alternative embodiment of the sandwich part according to the invention with tufted layers.

FIG. 4 shows a perspective representation of a feature of a layered structure 110 of a sandwich part 101 according to the invention which is rotated as compared to the representation in FIG. 3, the outer surface 116' of the second cover layer element 116 being visible in FIG. 4.

The variant of the sandwich part 101 according to the invention which is shown in FIG. 4 is not stitched, but rather tufted, the thread 120 forming loops 122 on the outer surface 116' of the second cover layer element 116 which is visible here.

The structure of such a stitched or tufted sandwich part 101 can be seen in detail from the enlarged representation of FIG. 3.

After the layered structure 110 has been stitched or tufted, as described above, a further processing of the layered structure 110 occurs, during which the synthetic resin matrix of the respective cover layer elements 112, 116 is crosslinked and cured for example by thermal action. If need be, yet another forming step may be provided before this, during which the sheetlike semifinished sandwich part, for example, is brought into a desired shape, which it then retains as the sandwich part after the crosslinking and curing of the cover layer elements 112, 116.

In the finished sandwich part 101, as represented in FIGS. 3 and 4, the cover layer elements 112, 116 and the core layer element 114 are joined together by the threads 120 which form the tensile force transmitting elements 102 passing transversely through the layered structure 110. Since the thread 120 after the crosslinking of the respective synthetic resin matrix of the cover layer elements 112, 116 is glued to the cover layer elements 112, 116, the thread 120 forms in each case a thread segment 120' in the region of one of each thread guide hole 121 as a tensile force transmitting element 102, which can transmit tensile forces between the two cover layer elements 112,116.

If a sandwich part 101 or a semifinished sandwich part according to the invention collides for example with an obstacle represented as a post P in FIG. 3 in the direction of the arrow F, such that the collision forces symbolized by the arrow F act on the sandwich part 101 from the side, i.e. transversely to the layered structure 110, transverse forces produced during this collision in the layered structure 110, which are acting upward and downward in the direction of the force arrows F1 and F2 in the example shown in FIG. 3, are braced by the segments 120' of the thread 120 located in the respective thread guide channel between the cover layer elements 112, 116. A detaching of the cover layer elements 112, 116 from the core layer element 114 is thereby prevented and the collision results in an effective fragmentation of the cover layer elements 112, 116 and the core layer element 114 in the region of the immediate collision of the sandwich part 101 with the post P already when the post P impinges on the sandwich part 101.

The invention is not restricted to the above sample embodiment, which only serves as a general explanation of the core idea of the invention. Instead, within the scope of protection, the device according to the invention may also take on forms of embodiment other than those described above. In particular, the device may have features representing a combination of the respective individual features of the claims.

Reference numbers in the claims, the description, and the drawings serve merely for a better understanding of the invention and are not meant to limit the scope of protection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle component, comprising:
at least one sandwich part which forms a crash element absorbing kinetic energy, wherein
the at least one sandwich part comprises a layered structure of at least two fiber-reinforced cover layer elements having a synthetic resin matrix and at least one core layer element provided between two adjacent cover layer elements, wherein
the at least one core layer element comprises channels which pass transversely through the at least one core layer element,
the at least one core layer element is formed from a foam material or a softwood, and
the channels provided in the at least one core layer element form predetermined breaking points for the at least one core layer element.

2. The vehicle component as claimed in claim 1, wherein at least one of the cover layer elements of the at least one sandwich part comprises channels which pass transversely through the respective cover layer element.

3. The vehicle component as claimed in claim 2, wherein the channels are arranged at least in one region of the sandwich part at uniform spacing from each other.

4. The vehicle component as claimed in claim 1, wherein the channels are arranged at least in one region of the sandwich part at uniform spacing from each other.

5. The vehicle component as claimed in claim 3, wherein the spacing between neighboring channels in other regions is likewise uniform, but larger or smaller than in neighboring regions of the at least one sandwich part.

6. The vehicle component as claimed in claim 4, wherein the spacing between neighboring channels in other regions is likewise uniform, but larger or smaller than in neighboring regions of the at least one sandwich part.

7. The vehicle component as claimed in claim 1, wherein the at least two fiber-reinforced cover layer elements comprise carbon fibers which are embedded in the respective synthetic resin matrix in a finished state of the at least one sandwich part.

8. The vehicle component as claimed in claim 1, wherein the channels are formed by through holes, which pass through the respective cover layer element or the respective core layer element.

9. The vehicle component as claimed in claim 1, wherein the channels are formed only in the core layer element and the openings of the channels are covered by the respective cover layer element.

10. The vehicle component as claimed in claim 1, wherein the channels are formed in the core layer element and in both cover layer elements.

11. The vehicle component as claimed in claim 1, wherein the at least one sandwich part comprises tensile force transmitting elements passing transversely through the at least two cover layer elements and the at least one core layer element, which join the at least two cover layer elements and the at least one core layer element to each other, and
the tensile force transmitting elements are led through the channels.

12. The vehicle component as claimed in claim 11, wherein
the tensile force transmitting elements are fixed by the synthetic resin matrix in or on the respective cover layer element.

* * * * *